United States Patent
Kountouris

(10) Patent No.: US 12,192,411 B2
(45) Date of Patent: Jan. 7, 2025

(54) METHOD AND SERVER FOR PROCESSING CALLS ORIGINATING FROM USER TERMINALS FOR CONNECTION WITH OPERATOR TERMINALS

(71) Applicant: ORANGE, Issy-les-Moulineaux (FR)

(72) Inventor: Apostolos Kountouris, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 18/002,982

(22) PCT Filed: Jun. 23, 2021

(86) PCT No.: PCT/FR2021/051155
§ 371 (c)(1),
(2) Date: Dec. 22, 2022

(87) PCT Pub. No.: WO2021/260329
PCT Pub. Date: Dec. 30, 2021

(65) Prior Publication Data
US 2023/0247141 A1    Aug. 3, 2023

(30) Foreign Application Priority Data
Jun. 24, 2020 (FR) ........................... 2006634

(51) Int. Cl.
*H04M 3/00* (2024.01)
*H04M 3/523* (2006.01)

(52) U.S. Cl.
CPC ....... *H04M 3/5238* (2013.01); *H04M 3/5231* (2013.01); *H04M 2203/2011* (2013.01)

(58) Field of Classification Search
CPC ............. H04M 3/5238; H04M 3/5231; H04M 2203/2011
(Continued)

(56) References Cited

U.S. PATENT DOCUMENTS 6,665,396 B1 * 12/2003 Khouri .................. H04M 3/523
379/266.01
6,724,885 B1 * 4/2004 Deutsch ............... H04M 3/523
379/88.2
(Continued)

FOREIGN PATENT DOCUMENTS

EP    1465398 A1    10/2004

OTHER PUBLICATIONS

English translation of the Written Opinion of the International Searching Authority dated Oct. 14, 2021 for corresponding International Application No. PCT/FR2021/051155, filed Jun. 23, 2021.
(Continued)

*Primary Examiner* — William J Deane, Jr.
(74) *Attorney, Agent, or Firm* — David D. Brush; Westman, Champlin & Koehler, P.A.

(57) ABSTRACT

A method for processing a first call received in a call centre via a telecommunications network, originating from a user terminal, includes placing the first call in a queue when no operator terminal of the call centre is available to take the first call. The method includes: transmitting, to the user terminal, an information message indicating to the user the possibility of making a second call within a determined time interval, while benefiting from the place of the first call in the queue; following receipt of an approval message originating from the user terminal, transmitting, to the user terminal, a user identification code, this code needing to be provided by the user at the time of the second call in order that the second call can take advantage of the place of the first call in the queue.

20 Claims, 3 Drawing Sheets

(58) Field of Classification Search
USPC ....... 379/265.01–265.14, 266.01–266.1, 309
See application file for complete search history.

(56) References Cited

U.S. PATENT DOCUMENTS

| | | | | |
|---|---|---|---|---|
| 7,274,787 | B1* | 9/2007 | Schoeneberger ... | H04M 3/5231 |
| | | | | 379/265.01 |
| 8,472,612 | B1 | 6/2013 | Goringe et al. | |
| 9,065,915 | B1 | 6/2015 | Lillard et al. | |
| 2001/0025309 | A1* | 9/2001 | MacLeod Beck .. | H04M 3/2281 |
| | | | | 455/554.1 |
| 2003/0231757 | A1* | 12/2003 | Harkreader ........... | H04M 3/523 |
| | | | | 379/265.02 |
| 2007/0130313 | A1 | 6/2007 | King | |
| 2017/0054849 | A1 | 2/2017 | Torre et al. | |
| 2017/0214797 | A1* | 7/2017 | Dhir ................... | H04M 3/5231 |

OTHER PUBLICATIONS

International Search Report dated Oct. 6, 2021 for corresponding International Application No. PCT/FR2021/051155, filed Jun. 23, 2021.
Written Opinion of the International Searching Authority dated Oct. 6, 2021 for corresponding International Application No. PCT/FR2021/051155, filed Jun. 23, 2021.

* cited by examiner

METHOD AND SERVER FOR PROCESSING CALLS ORIGINATING FROM USER TERMINALS FOR CONNECTION WITH OPERATOR TERMINALS

CROSS-REFERENCE TO RELATED APPLICATIONS

This application is a Section 371 National Stage Application of International Application No. PCT/FR2021/051155, filed Jun. 23, 2021, which is incorporated herein by reference in its entirety and published as WO 2021/260329 A1 on Dec. 30, 2021, not in English.

TECHNICAL FIELD

The present invention relates in general to the field of telecommunications networks, and relates in particular to the handling of calls received from user terminals, via telecommunications networks, in call centers providing services.

PRIOR ART

A call center is an infrastructure or platform consisting mainly of technical and real estate resources (offices) and managed by people, some of whom, often called operators or advisers, are put through to customers or users to provide them with assistance and advice with regard to the sale or after-sale (after-sales service) of services or products that are sold, or else assistance with using products (a help desk).

Advisers or operators are generally distributed in office spaces having communication terminals—for example, desktop computers associated with telephone terminals—and in which telephone calls, but also e-mails, short messages (SMS), etc., are distributed. These calls may be classified as incoming, when they are received by the operators in the center, originating from customers or users, or, conversely, as outgoing, when they are made by the operators. Generally speaking, incoming telephone calls are received in a server platform responsible for routing them to the terminals of the operators based on the availability of said operators, and on the order of arrival of the incoming calls. To this end, when all of the operators are busy, incoming calls are placed, according to their order of arrival, in a FIFO (First In, First Out) queue managed by the server platform. This server platform is also generally equipped with an interactive voice server that vocally offers users a certain number of options for handling their calls, in particular when all of the operator terminals are already busy.

From among the known options for handling an incoming call when no operator is available, the one referred to as "callback function" consists in inviting the calling user to be called back automatically when an operator becomes available.

With regard to the callback function, patent document EP1465398A1 describes a call control server operating so as to receive calls from user terminals and to organize the connection of the calls to operator terminals. The call control server comprises a queue handler responsible for placing calls in a queue waiting to be connected to one of the operator terminals. The call control server is able to determine, according to a current waiting time for calls in the queue, a probable callback time at which the call control server will be able to connect an operator terminal to a user terminal under consideration, and then to communicate the callback time to the user terminal. In response to the user accepting the callback time, the call control server will initiate a call to the user at the callback time in order to connect the user's terminal to an operator terminal.

The callback function outlined above is advantageous as it allows the user to be able to hang up without having to wait while listening to a voice server for his call to be taken into account by an operator; it therefore allows the user to save time and also money since the communication time is shortened. However, the user has to remain close to his communication terminal or keep his terminal on him (in the case of a cell phone for example), which is restrictive, all the more so since the waiting time for the callback is lengthy. Moreover, it may be the case that, at the callback time, the user is no longer available to take the call, which causes him to lose his place in the queue.

The present invention aims in particular to improve the situation outlined above.

SUMMARY OF THE INVENTION

The present invention proposes, according to a first aspect, a method for handling a first call received in a call center via a telecommunications network, originating from a user terminal, comprising placing the first call in a queue when no call center operator terminal is available to take the first call. According to the invention, this method is noteworthy in that it comprises:
  transmitting, to the user's terminal, a user identification code (CIU), said code having to be obtained in a second call that has to be made subsequently by the user, within a determined time interval (INT), so as to allow the second call to benefit from the place of the first call in the queue.

By virtue of the method as defined in brief above, the user whose call is in the queue, once the identification code has been obtained, is able to hang up and does not have to wait to be called back, as is the case with the known callback function, since it is said user who has to subsequently call back the call center, preferably within the time interval given to him, by communicating his identification code in order to be able to benefit from his initial place (obtained in the first call) in the queue.

According to one particular implementation of the method, said code is provided by the user in the second call.

According to one particular implementation, the method comprises:
  transmitting, to the user's terminal, an information message indicating to the user the possibility of making the second call within the time interval (INT), while benefiting from the place of the first call in the queue;
  following the receipt of an approval message from the user terminal, transmitting, to the user terminal, the user identification code (CIU) that has to be obtained in the second call so that the second call is able to benefit from the place of the first call in the queue.

This implementation offers the user the possibility of accepting or not accepting the option proposed by the server, according to which the user may call back the server later using a specific code allowing him to keep his initial place (the place of the first call) in the queue, on the condition however of complying with the communicated time interval (INT) to make the second call.

According to one embodiment of the method, in the first call, the user identification code (CIU) is created and is placed in the queue in place of an identifier of the first call.

Such an identifier is for example the telephone number associated with the user's terminal with which the first call was made. When the user calls back the call center and communicates his identification code, said identification code is thereby searched for in the queue and the corresponding place is assigned to the user, who thus recovers his initial place.

According to one embodiment, the method comprises:
estimating, based on the state of the queue, for the first call, a waiting time (DATE) before the user terminal is put through to an operator terminal; and
if the waiting time (DATE) exceeds a threshold value, transmitting the above-mentioned information message to the user terminal.

The information message is thus sent to the user only if the waiting time is greater than a determined value, for example five minutes, thereby making it possible to limit the risk of a callback from the user taking place after the user's code has been removed from the waiting list.

According to one particular embodiment feature, the time interval for making the second call is between the time of receipt of the first call (t0) and the time ($t_{DATE}$) corresponding to the time of receipt of the first call plus the estimated waiting time (DATE).

If the user makes his second call within the above-mentioned time interval, the risk of his place in the queue being lost is thereby minimized.

According to one particular embodiment feature, the time interval for making the second call is a fixed period of time, strictly less than the estimated waiting time (DATE), during which the second call will benefit from the place of the first call in the queue.

This makes it possible to limit the risk for the user of losing his place in the queue, if for example the average time for being put through to an operator is overestimated for the calculation of the waiting time, or if other users in the queue do not make their second call, which could bring the user's code to the front of the queue and cause him to lose his place if the user does not call back in time.

According to one particular embodiment, the method comprises, following the receipt of the second call from the user:
determining the place in the queue corresponding to the user identification code (CIU) communicated by the user;
waiting for the user terminal to be put through to an operator terminal when the place in the queue is close to the front of the queue;
creating a second user identification code and placing the second code at the back of the queue when the user identification code is no longer in the queue.

According to the above embodiment, if the user's code is no longer in the queue-in practice the code is indicated as expired-then the second code created for the user allows said user to restart the handling process with this second code in a subsequent call (a third call from the user).

According to one particular implementation of the method, the second identification that is created is the same as the user identification code.

Thus, for a user and/or a user terminal under consideration, the identification code that is initially generated will remain assigned to the user, which will avoid the user having to receive it and, if necessary, to remember it again.

According to one embodiment, the method comprises an action of monitoring the user call queue, in which, if a user identification code reaches the front of the queue and no second call with this code has been received, one of the following commands is executed:

demote the identification code in the queue by a determined number of places;
place the identification code at the back of the queue;
remove the identification code from the queue.

With this action of monitoring the queue, it is thus possible to apply a determined command according to a predefined handling strategy when a user identification code reaches the front of the queue without any second call with this code having yet been received.

According to a second aspect, the present invention relates to a telecommunications server intended to handle calls originating from user terminals via a telecommunications network in order to put the user terminals through to operator terminals of a call center; the server is configured to place a first call received from a user terminal in a queue when no operator terminal is available to take the first call. According to the invention, this server comprises a call handling unit configured to:
transmit, to the user's terminal, a user identification code (CIU), said code having to be obtained in a second call that has to be made subsequently by the user, within a determined time interval (INT), so as to allow the second call to benefit from the place of the first call in the queue.

According to one embodiment, the call handling unit of the server is configured to:
transmit, to the user's terminal, an information message indicating to the user the possibility of making the second call within the determined time interval (INT), while benefiting from the place of the first call in the queue;
following the receipt of an approval message from the user terminal, transmit, to the user terminal, the user identification code (CIU) that has to be obtained in the second call so that the second call is able to benefit from the place of the first call in the queue.

According to a third aspect, the present invention relates to a computer program implemented in a telecommunications server, this program comprising instructions the execution of which by a processor of the server causes the execution of the steps of a method for handling a first call received in a call center, as defined above.

Such a program may use any programming language, and comprise one or more programs in the form of source code, object code, or of intermediate code between source code and object code, such as in a partially compiled form, or in any other desirable form.

According to a fourth aspect, the invention relates to a communication terminal for implementing some of the steps of the method defined above and on which there is installed a software application able to communicate with the call center, this application being configured to:
store the user identification code when it is transmitted by the telecommunications server (SVR) as defined above;
transmit the user identification code automatically to said server, when the user makes the second call to the call center.

The invention therefore also targets, according to a last aspect, a computer-readable information recording medium on which there is stored a computer program as disclosed above. Such a recording medium may consist of any device capable of storing such a computer program. For example, the medium may comprise a storage means, such as a ROM, for example a CD-ROM or a microelectronic circuit ROM, or else a removable recording means such as a USB key or a magnetic recording means, such as a hard disk. On the other hand, a computer program according to the invention may, in particular, be downloaded from an Internet network.

The advantages afforded by a server, a terminal and a computer program, as briefly defined above, are identical to or contribute to those mentioned above in relation to the method for handling a first call in a call center, according to the invention, and will therefore not be repeated here.

BRIEF DESCRIPTION OF THE DRAWINGS

Other features, details and advantages will become apparent from reading the following detailed description, and from analyzing the appended drawings, in which.

DETAILED DESCRIPTION

Figure 1:
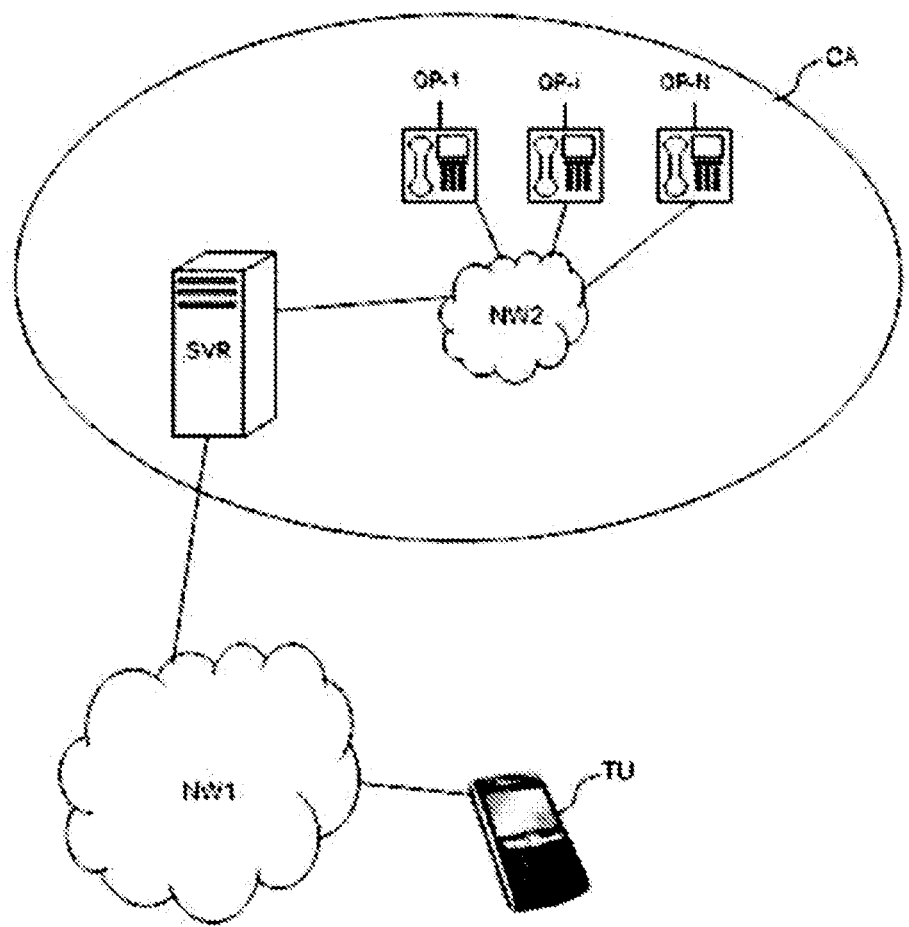
FIG. 1 illustrates one example of a telecommunications environment in which the method according to the invention may be implemented.

FIG. 1 illustrates one example of a telecommunications environment in which the method according to the invention may be implemented. The environment that is shown comprises a communication terminal TU, such as a cell phone of smartphone type, of a user, connected to a mobile telephony network (3G, 4G, etc.), not shown, giving access to a first network NW1 of Internet type, to which there is also connected a call handling server SVR of a call center CA comprising a set of N operator terminals OP-1 to OP-N connected to a network NW2, for example an IP (Internet Protocol) network such as a company intranet. This call center is for example associated with an after-sales service of a commercial company.

As explained above, what is proposed according to the present invention is a method for handling a first call received in a call center via a telecommunications network, originating from a user terminal. This method comprises in particular placing the first call in a queue when no call center operator terminal is available to take the first call, and transmitting, to the user's terminal, an information message indicating to the user the possibility of making a second call within a determined time interval (INT), while benefiting from the place of the first call in the queue; finally, following the receipt of an approval message from the user terminal, transmitting, to the user terminal, a user identification code (CIU), this code having to be provided by the user in the second call so that the second call is able to benefit from the place of the first call in the queue. In the context of the present description, the implementation of the call method according to the invention, as briefly summarized above, is referred to as "deferred call service" (SAD); this implementation is based essentially on a call handling unit, in practice an element that is essentially of a software nature, incorporated into the server SVR.

Figure 2:
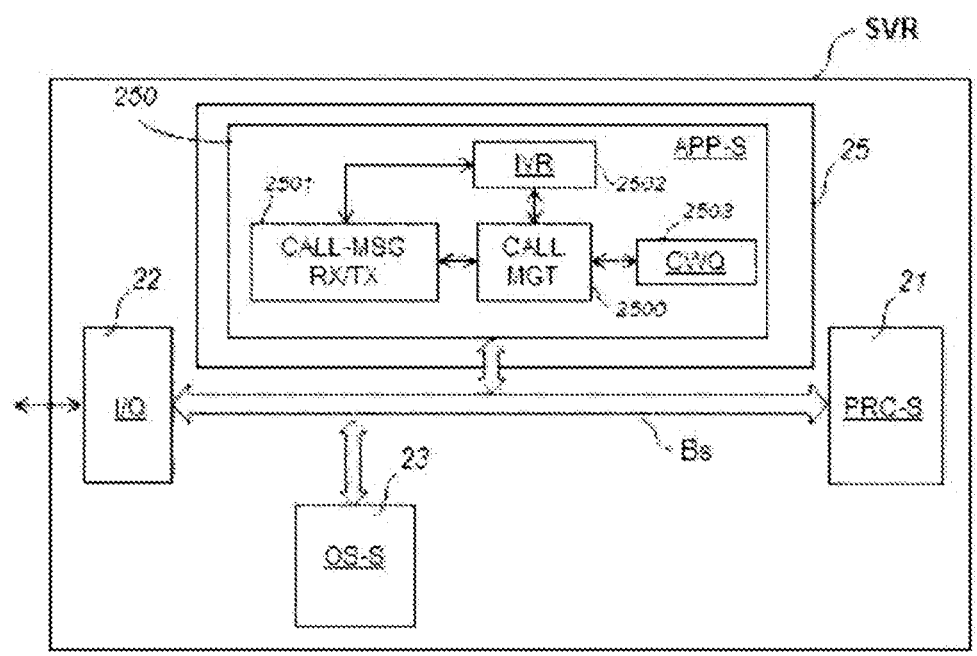
FIG. 2 shows the functional modules of a call handling server of a call center, configured to implement a call handling method according to the invention.

FIG. 2 shows the functional modules of a call handling server of a call center, configured to implement a call handling method according to the invention. As illustrated in FIG. 2, the server SVR also consists of elements arranged in a conventional computer hardware architecture, comprising in particular a processor (PRC-S) 21 and a memory 25 comprising ROM and RAM memory components and communicating via a set of data buses (Bs).

From a functional viewpoint, the server SVR includes in particular the functional modules described below:

A network communication interface module (I/O) 22, configured to communicate, via the network NW1, with user terminals such as the terminal TU, and, via the network NW2, with operator terminals (or advisers) OP-i of the call center. To this end, the network interface module 22 of the server may use various communication protocols, such as for example an HTTP (HyperText Transfer Protocol), HTTPS (HyperText Transfer Protocol Secure) or SIP (Session Initiation Protocol) protocol.

An operating system module (OS-S) 23, for example the Linux or UNIX operating system, managing the interaction between the various modules of the server and the processor (PRC-S).

The above-mentioned call handling unit (APP-S) 250, recorded in the memory 25, and comprising in particular a module 2500 (CALL MGT) for managing incoming calls originating from user terminals, cooperating in particular with a module 2501 for receiving/transmitting messages and calls (CALL-MSG RX/TX), an interactive voice server module 2502 (IVR—Interactive Voice Response) responsible for establishing interactive dialog with a user during an incoming call, and a data structure designed to provide a FIFO (First In First Out) queue (CWQ—Call Waiting Queue) of incoming calls originating from user terminals (TU).

In connection with FIG. 3, a description will now be given, according to one exemplary implementation, of the main steps of the method for handling a call received in a call center, according to the invention. In this example, the method is implemented in the environment of FIG. 1 and by the call handling server described in relation to FIG. 2.

Figure 3:
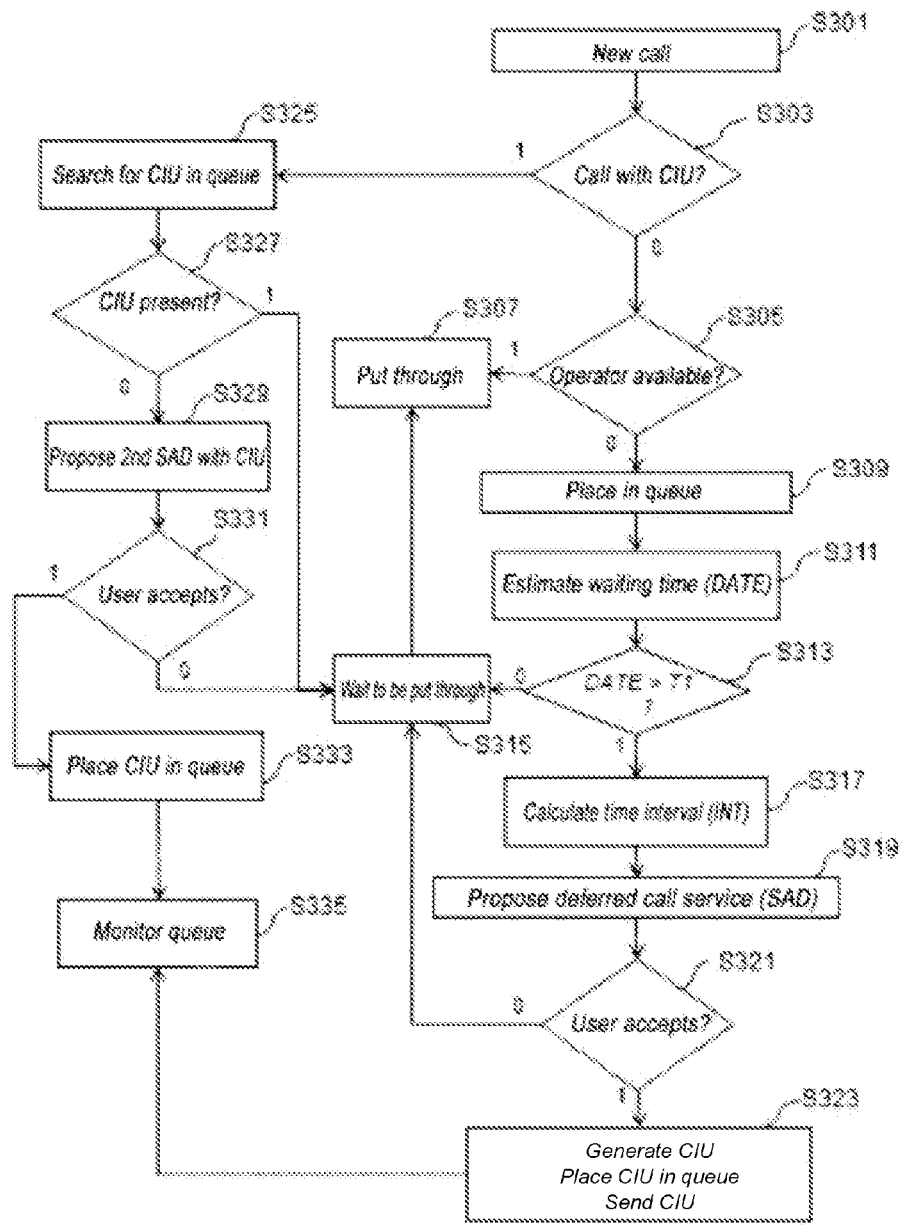
FIG. 3 shows, in the form of a flowchart, the main steps of a method for handling a call received in a call center via a telecommunications network, originating from a user terminal, according to one embodiment of the invention.

As shown in FIG. 3, the method begins with a step S301 of receiving a new incoming call originating from a user terminal TU. In the following step S303, the handling unit 250 (module 2500) of the server determines whether this call is associated with a user identification code (CIU); in other words, the unit 250 determines whether or not it is a second call for which the correspondent (the user of the terminal TU) has provided a code CIU, for example by speaking the code during the dialog with the interactive voice server (IVR 2502). If so ("1"), the method moves to step S325 described below; if not ("0"), it is therefore a first call, and the method moves to step S305.

Step S305 is a test step in which the call management module 2500 consults the queue 2503 to determine whether an operator is available to take the incoming call. If so ("1"), the call is connected, in step S307, to a terminal OP-i of an operator, and the user is put through to the operator.

If not, that is to say if previous calls are already in the queue, then the new call is placed at the back of the queue, in step S309. In practice, according to one exemplary embodiment, the call is identified in the queue by the telephone number associated with the call; in the case of a call made by a mobile telephony terminal, this will be an MSISDN number (Mobile Station ISDN Number) stored in a SIM (Subscriber Identity Module) card incorporated in the terminal (TU) of the caller.

In following step S311, the call management module (2500) estimates the waiting time (DATE) based on the state of the queue, that is to say the number of incoming calls already waiting. In step S313, the estimated waiting time (DATE) is compared with a predefined threshold value (T1), below which it is not deemed appropriate to offer the deferred call service (SAD) to the user. This threshold value T1 is for example set to five minutes, thereby making it possible to limit the risk of the user calling back after a code provided to the user has been removed from the waiting list, given the inaccuracy in estimating the waiting time, this inaccuracy being in particular due to the variability in the duration of a communication between a caller and an operator. Thus, if the estimated waiting time (DATE) is lower than the threshold value T1 ("0"), the caller is told to wait to be put through to an operator (S315).

If, in step S313 ("1"), the estimate of the waiting time is greater than the threshold value T1, in following step S317, a time interval (INT) is calculated, which time interval will be communicated to the user to make the second call as part of the deferred call service (SAD). According to one exemplary embodiment, the time interval (INT) is determined as being the duration between the time (t0) of receipt of the first call (initial call) and the time ($t_{DATE}$) corresponding to the time of receipt of the first call plus the estimated waiting time (DATE). If the user makes his second call within the time interval INT, the risk of his place in the queue being lost when he makes the second call is thereby minimized. More simply, according to another example, the time interval INT may be determined as being a period of time, strictly less than the estimated waiting time (DATE), during which the second call will benefit from the place of the first call in the queue; it is possible for example to define the time interval INT as being the estimated waiting time (DATE) minus three minutes.

In step S319, the interactive voice server (IVR) announces the estimated waiting time to the user and offers him the deferred call service (SAD). In step S321, if the user declines the deferred call and chooses to wait ("0"), his call is kept in the queue before being put through to an operator (S315).

On the contrary, if the user accepts the deferred call service (S321, "1"), the method moves to step S323, in which a user identification code (CUI) is generated by the call management module (2500), the generated code is recorded in the queue in place of the number corresponding to the initial call (first call), and the code CIU is transmitted to the user. According to one exemplary embodiment, the code CUI is an alphanumeric code that is transmitted vocally (via the interactive voice server) to the user. As an alternative or in addition, it is possible to make provision to send the code CUI in the form of an SMS (Short Message Service) message.

In the following step, S335, the call management module (2500) performs queue monitoring, during which, for each user identification code (CUI) placed in the queue, the place of the code CUI is checked such that, if a user identification code reaches the front of the queue and no second call using the deferred call service (SAD) with this code has been received, a command according to the following options is executed, the choice of the option depending on the implementation of the method under consideration:
  (i) demote the identification code in the queue by a determined number of places; or,
  (ii) place the identification code at the back of the queue; or,
  (iii) remove the identification code from the queue.

Option (i) may be implemented for a determined duration, for example two hours at most after the first call, in order to keep an intermediate place in the queue for the user who has the code. For example, the number of places may be determined as being that allowing the code to be demoted to be located in the middle of the queue. Option (ii) will allow the user to keep his code in the queue—for example for a maximum duration set to two hours as in option (i)—if he calls back after the above-mentioned time interval INT has expired. Finally, option (iii) will force the user to restart the call process from the beginning if he does not make his second call, using the deferred call service, within the time interval INT that has been communicated to him (step S319).

Returning to step S303 ("1"), upon a new received call (S301), if the handling unit (250) of the call handling server determines that the received call is associated with a user identification code (CIU) provided by the user, for example vocally during the dialog with the interactive voice server (2502), then this means that this new call is a "second call" made by the caller (the user of the terminal TU) using the deferred call service. In this case, in step S325, the call management module (2500) searches for the code CIU provided by the user in the queue (2503). In step S327 ("1"), if the code CIU is still in the queue, then the ongoing call will be put on hold to be put through (step S315) to an operator terminal, until the user's code CIU reaches the front of the queue and the call is connected (S307) to a terminal of an available operator. It will be noted here that, in step S327, if the user's code CIU is still in the queue but it is located at a place far from the front of the queue, for example because the code has been demoted in line with option (i) explained above, then the user may be offered a second code CIU as explained below in relation to step S329 (mechanism not shown in FIG. 3 for the sake of simplification).

Still in step S327, if the code CIU provided by the user is not found in the queue (S327, "0"), then, in step S329, a new deferred call service (SAD) proposal with a new code CIU (second code CIU) is made to the user. If the user declines (S331, "0"), then the caller is invited to wait to be put through to an operator (S315). By contrast, if the user again accepts the deferred call service (S331, "1"), a new code (second code CIU) is generated, recorded in the queue at the back of the queue, in step S333, and is then communicated to the user with an associated time interval INT, calculated as explained above (step S317). The step (S335) of monitoring the queue is then implemented as explained above.

It should be noted that, in FIG. 3, a "second" code CIU is not mentioned. Indeed, according to the embodiment illustrated by FIG. 3, the second code CIU is chosen as being identical to the first code CIU. It is thereby not necessary to generate a new code and to communicate it to the user, thereby simplifying the process, and moreover, there is no need for the user to remember a new code, which is advantageous for said user.

According to one variant implementation of the method according to the invention, the code CIU assigned to the user is associated with the telephone number of the user's terminal in an association table stored in the server and, in the second call, the code CIU is obtained automatically from the user's telephone number.

According to another variant, a communication application able to communicate with the call center (CA) is installed beforehand on the user's terminal and stores the user's code CIU when it is transmitted by the telecommunications server (SVR). The code CIU is then transmitted automatically by the communication application of the terminal to the server, when the user makes the second call to the call center.

The invention claimed is:

1. A method for handling a first call received in a call center via a telecommunications network, originating from a user terminal, the method being implemented by a device and comprising:
placing the first call in a queue when no call center operator terminal is available to take the first call;
creating a user identification code and placing the user identification code in the queue instead of an identifier of the first call; and
transmitting, to the user terminal, the user identification code, said code being a code required to be obtained in a second call that has to be made subsequently by a user of the user terminal, within a determined time interval, so as to allow the second call to benefit from a place of the first call in the queue.

2. The method as claimed in claim 1, wherein said code is provided by the user in the second call.

3. The method as claimed in claim 1, comprising:
transmitting, to the user terminal, an information message indicating to the user a possibility of making the second call within said time interval, while benefiting from the place of the first call in the queue;
following receipt of an approval message from the user terminal, transmitting, to the user terminal, said user identification code that has to be obtained in the second call so that the second call is able to benefit from the place of the first call in the queue.

4. The method as claimed in claim 1, comprising:
estimating, based on a state of the queue, for the first call, a waiting time before the user terminal is put through to an operator terminal; and
in response to the waiting time exceeding a threshold value, transmitting said information message to the user terminal.

5. The method as claimed in claim 4, wherein the time interval for making the second call is between a time of receipt of the first call and a time corresponding to the time of receipt of the first call plus the estimated waiting time.

6. The method as claimed in claim 4, wherein the time interval for making the second call is a fixed period of time, strictly less than the estimated waiting time, during which the second call will benefit from the place of the first call in the queue.

7. The method as claimed in claim 1, comprising, following receipt of the second call from the user:
determining the place in the queue corresponding to the user identification code communicated by the user;
waiting for the user terminal to be put through to an operator terminal when the place in the queue is close to a front of the queue; or
creating a second user identification code and placing the second code at a back of the queue when the user identification code is no longer in the queue.

8. The method as claimed in claim 7, wherein said second identification code is the same as the user identification code.

9. The method as claimed in claim 1, comprising an action of monitoring the queue, in which, if the user identification code reaches a front of the queue and no second call with this code has been received, one of the following commands is executed:
demote the identification code in the queue by a determined number of places;
place the identification code at a back of the queue;
remove the identification code from the queue.

10. A telecommunications server to handle calls originating from user terminals via a telecommunications network in order to put the user terminals through to operator terminals of a call center, said server comprising:
a processor;
a non-transitory computer readable medium comprising instructions stored thereon which when executed by the processor configure the processor to:
place a first call received from a user terminal in a queue when no operator terminal is available to take the first call;
creating a user identification code and placing the user identification code in the queue instead of an identifier of the first call; and
transmit, to the user terminal, the user identification code, said code being a code required to be obtained in a second call that has to be made subsequently by user of the user terminal, within a determined time interval, so as to allow the second call to benefit from a place of the first call in the queue.

11. The telecommunications server as claimed in claim 10, wherein said code is provided by the user in the second call.

12. The telecommunications server as claimed in claim 10, wherein said instructions configure the processor to:
transmit, to the user terminal, an information message indicating to the user the possibility of making the second call within said time interval, while benefiting from the place of the first call in the queue;
following receipt of an approval message from the user terminal, transmit, to the user terminal, said user identification code that has to be obtained in the second call so that the second call is able to benefit from the place of the first call in the queue.

13. The telecommunications server as claimed in claim 12, wherein, in the first call, said user identification code is created and is placed in the queue in place of an identifier of the first call.

14. A non-transitory computer readable medium comprising a computer program stored thereon, said program comprising instructions which when executed by a processor of a telecommunications server causes execution of a method for handling a first call received in a call center via a telecommunications network, originating from a user terminal, the method comprising:
placing the first call in a queue when no call center operator terminal is available to take the first call;
creating a user identification code and placing the user identification code in the queue instead of an identifier of the first call; and
transmitting, to the user terminal, the user identification code, said code being a code required to be obtained in a second call that has to be made subsequently by a user of the user terminal, within a determined time interval, so as to allow the second call to benefit from a place of the first call in the queue.

15. A communication terminal comprising:
a processor; and
a non-transitory computer readable medium comprising a software application stored thereon able to communicate with a call center, said application comprising instructions which when executed by the processor configure the communication terminal to:
make a first call via a telecommunications network, the first call being received by a telecommunications server, which places a user identification code instead of an identifier of the first call in a queue when no call center operator terminal is available to take the first call and transmits a user identification code to the communication terminal;

receive the user identification code transmitted by the telecommunications server;

store the user identification code;

make a second call to the call center within a determined time interval; and transmit said user identification code automatically to said telecommunications server, when the communication terminal makes the second call to the call center within the determined time interval, so as to allow the second call to benefit from a place of the first call in the queue.

16. The telecommunications server as claimed in claim 12, wherein said instructions configure the processor to:
   estimate, based on a state of the queue, for the first call, a waiting time before the user terminal is put through to an operator terminal; and
   in response to the waiting time exceeding a threshold value, transmitting said information message to the user terminal.

17. The telecommunications server as claimed in claim 16, wherein the time interval for making the second call is between a time of receipt of the first call and a time corresponding to the time of receipt of the first call plus the estimated waiting time.

18. The telecommunications server as claimed in claim 16, wherein the time interval for making the second call is a fixed period of time, strictly less than the estimated waiting time, during which the second call will benefit from the place of the first call in the queue.

19. The telecommunications server as claimed in claim 12, wherein said instructions configure the processor to, following receipt of the second call from the user:
   determine the place in the queue corresponding to the user identification code communicated by the user;
   wait for the user terminal to be put through to an operator terminal when the place in the queue is close to a front of the queue; or
   create a second user identification code and placing the second code at a back of the queue when the user identification code is no longer in the queue.

20. The telecommunications server as claimed in claim 19, wherein said second identification code is the same as the user identification code.

* * * * *